(12) United States Patent
Lee et al.

(10) Patent No.: US 12,499,543 B2
(45) Date of Patent: Dec. 16, 2025

(54) BRAIN TUMOR TYPES DISTINGUISH SYSTEM, SERVER COMPUTING DEVICE THEREOF AND NON-TRANSITORY COMPUTER READABLE STORAGE MEDIUM

(71) Applicants: National Yang Ming Chiao Tung University, Taipei (TW); TAIPEI VETERANS GENERAL HOSPITAL, Taipei (TW)

(72) Inventors: Cheng-Chia Lee, Taipei (TW); Huai-Che Yang, Taipei (TW); Wen-Yuh Chung, Taipei (TW); Chih-Chun Wu, Taipei (TW); Wan-Yuo Guo, Taipei (TW); Ya-Xuan Yang, Taipei (TW); Tzu-Hsuan Huang, Taipei (TW); Chun-Yi Lin, Taipei (TW); Wei-Kai Lee, Taipei (TW); Chia-Feng Lu, Taipei (TW); Yu-Te Wu, Taipei (TW)

(73) Assignees: NATIONAL YANG MING CHIAO TUNG UNIVERSITY, Taipei (TW); TAIPEI VETERANS GENERAL HOSPITAL, Taipei (TW)

( * ) Notice: Subject to any disclaimer, the term of this patent is extended or adjusted under 35 U.S.C. 154(b) by 671 days.

(21) Appl. No.: 17/888,798

(22) Filed: Aug. 16, 2022

(65) Prior Publication Data
US 2023/0274432 A1 Aug. 31, 2023

(30) Foreign Application Priority Data
Feb. 25, 2022 (TW) .................................. 111107109

(51) Int. Cl.
*G06T 7/00* (2017.01)
*G06V 10/25* (2022.01)
(Continued)

(52) U.S. Cl.
CPC ............ *G06T 7/0014* (2013.01); *G06V 10/25* (2022.01); *G06V 10/764* (2022.01); *G16H 30/20* (2018.01);
(Continued)

(58) Field of Classification Search
CPC ......... G06T 7/0014; G06T 2207/30016; G06T 7/0012; G06V 10/25; G06V 10/764
See application file for complete search history.

(56) References Cited

U.S. PATENT DOCUMENTS

2018/0096191 A1* 4/2018 Wan ..................... G06V 10/772
2019/0156159 A1 5/2019 Kopparapu
(Continued)

FOREIGN PATENT DOCUMENTS

CN 105447872 A 3/2016
CN 109816657 A 5/2019
(Continued)

OTHER PUBLICATIONS

Alqudah, Ali Mohammad et al., "Brain Tumor Classification Using Deep Learning Technique-A Comparison between Cropped, Uncropped, and Segmented Lesion Images with Different Sizes," International Journal of Advanced Trends in Computer Science and Engineering, The World Academy of Research in Science and Engineering, Nov. 2019, vol. 8, No. 6, pp. 3684-3691.
(Continued)

*Primary Examiner* — Ayodeji O Ayotunde
(74) *Attorney, Agent, or Firm* — MUNCY, GEISSLER, OLDS & LOWE, P.C.

(57) ABSTRACT

A brain tumor types distinguish system includes an image outputting device and a server computing device. The image outputting device outputs at least three brain images captured from the position of a brain tumor. The server computing device pre-stores a plurality of distinguish pathways
(Continued)

corresponding to different types of brain tumors. The server computing device includes an image receiving module, an image pre-processing module, a data comparison module and a distinguish module. The image receiving module receives the brain images. The image pre-processing module pre-processes the brain images to obtain corresponding processed images thereof. The data comparison module compares the brain images and the processed images with the distinguish pathways to obtain at least three comparison results. The distinguish module statistically analyzes the comparison results to obtain a distinguish result.

16 Claims, 6 Drawing Sheets

(51) Int. Cl.
*G06V 10/764* (2022.01)
*G16H 30/20* (2018.01)

(52) U.S. Cl.
CPC .............. *G06T 2207/20081* (2013.01); *G06T 2207/30016* (2013.01); *G06T 2207/30096* (2013.01); *G06V 2201/031* (2022.01)

(56) References Cited

U.S. PATENT DOCUMENTS

2020/0275857 A1* 9/2020 Lou .................. G01R 33/50
2021/0353360 A1* 11/2021 Ito .................. G06T 7/0012
2022/0065788 A1* 3/2022 Chang ............... G01N 21/6486

FOREIGN PATENT DOCUMENTS

CN   111047589 A   4/2020
JP   2010012176 A  1/2010

OTHER PUBLICATIONS

Mondal Mrinmoy et al., "Deep Transfer Learning Based Multi-Class Brain Tumors Classification Using MRI Images",2021 3rd International Conference on Electrical & Electronic Engineering(ICEEE), IEEE,Dec. 22, 2021(Dec. 22, 2021), pp. 73-76,XP034094341, DOI: 10.1109/ICEEE54059.2021.9719003.
Alnemer Alaa et al., "An Efficient Transfer Learning-based Model for Classification of Brain Tumor", 2021 5th International Symposium on Multidisciplinary Studies and Innovative Technologies(ISMSIT), IEEE,Oct. 21, 2021(Oct. 21, 2021), pp. 478-482,XP034025566,DOI: 10.1109/ISMSIT52890.2021.9604677.
Ghavami Nooshin., "Automatic analysis of medical images for change detection in prostate cancer", PhD Thesis, Aug. 28, 2020(Aug. 28, 2020), pp. 1-158,XP093100462, London, UK.
Ismael et al., "An enhanced deep learning approach for brain cancer MRI images classification using residual networks," Artificial Intelligence in Medicine 102 (2020) pp. 1-8, 8 pages.
Deepak et al., "Brain tumor classification using deep CNN features via transfer learning," Computers in Biology and Medicine 111 (2019), pp. 1-7, 7 pages.
Chelghoum et al., "Transfer Learning Using Convolutional Neural Network Architectures for Brain Tumor Classification from MRI Images," IFIP International Conference on Artificial Intelligence Applications and Innovations, AIAI 2020: Artificial Intelligence Applications and Innovations, 2020, pp. 189-200, 12 pages.
Ge et al., "Enlarged Traning Dataset by Pairwise GANs for Molecular-Based Brain Tumor Classification," IEEE Access, vol. 8 (2020) pp. 22560-22570, 11 pages.

* cited by examiner

BRAIN TUMOR TYPES DISTINGUISH SYSTEM, SERVER COMPUTING DEVICE THEREOF AND NON-TRANSITORY COMPUTER READABLE STORAGE MEDIUM

CROSS REFERENCE TO RELATED APPLICATIONS

This Non-provisional application claims priority under 35 U.S.C. § 119(a) on Patent Application No(s). 111107109 filed in Taiwan, Republic of China on Feb. 25, 2022, the entire contents of which are hereby incorporated by reference.

BACKGROUND

Technology Field

The present disclosure relates to a brain tumor types distinguish system, a server computing device thereof, and a computer readable storage medium. In particular, the present disclosure relates to a system for distinguishing the brain tumor type before treating the brain tumor, a server computing device thereof, and a computer readable storage medium.

Description of Related Art

The brain is an important organ of human body, and its function cannot be substituted by others. Therefore, it is necessary to pay special attention to the health of the brain. One of the main factors that easily affect the health of brains is brain tumors. There are various types of brain tumors, which can be generally classified to benign brain tumors and malignant brain tumors. Malignant brain tumor contains cancerous cells and usually grows rapidly. When it invades brain tissues, it will affect the normal function of brain and may threaten patient's life. Although benign brain tumors do not contain cancerous cells and do not invade the neighbor tissues, however, if the benign tumor is located in the brain area relating to life maintenance, the brain tissues may be compressed and the function of the brain area may be affected.

Different types of brain tumors are treated by different ways, and the survival rates of brain tumors can vary widely by age, types of tumors and staging. Therefore, accurate and prompt diagnosis of brain tumors play an important role in making effective treatment planning. Diagnosis tests of brain tumors can be roughly divided into invasive and non-invasive. Although biopsy is considered as the golden standard of brain tumor type diagnosis, it is an invasive inspection, which is time-consuming and exists inter-observer variability due to subjective judgments of medical staffs. Another safer way to diagnose brain tumors is through imaging exams, but it requires extensive brain imaging observations by experienced surgeons to determine the type of tumor. Therefore, this method is also subjective and time-consuming.

Therefore, it is desired to provide a safe and fast way to diagnose brain tumors of patients based on brain tumor images so as to provide the distinguish result of the brain tumor type to the medical staff, so that the medical staff can provide proper and better treatment methods for different patients, thereby improving the treatment effect, avoiding doubts in the patients due to poor treatment results and psychological pressures in the medical staffs, and even preventing delays in treatment.

SUMMARY

An objective of this disclosure is to provide a brain tumor types distinguish system, which can rapidly provide the distinguish result of the brain tumor type based on brain tumor images, so that the medical staffs can provide proper treatment methods for different patients, thereby improving the treatment effect.

To achieve the above, a brain tumor types distinguish system, which includes an image outputting device and a server computing device. The image outputting device outputs at least three brain images captured from a position of a brain tumor. The server computing device pre-stores a plurality of distinguish pathways corresponding to different types of brain tumors. The server computing device includes an image receiving module, an image pre-processing module, a data comparison module, and a distinguish module. The image receiving module receives the brain images. The image pre-processing module pre-processes the brain images to obtain corresponding processed images thereof. The data comparison module compares the brain images and the processed images with the distinguish pathways to obtain at least three comparison results. The distinguish module statistically analyzes the comparison results to obtain a distinguish result.

In one embodiment, the distinguish module includes a scoring unit and a distinguish unit. The scoring unit evaluates each of the comparison results to obtain a scoring result, and the distinguish unit statistically analyzes the scoring results to obtain the distinguish result.

In one embodiment, the comparison result includes Vestibular Schwannoma, Meningioma, Pituitary Adenoma, Schwannoma, Glioma, or Metastasis.

In one embodiment, the scoring unit further performs a weighting process to the comparison result of Meningioma so as to obtain a weighted scoring result.

In one embodiment, the server computing device further pre-stores favorite location information of the different types of brain tumors, the data comparison module further compares the brain images and the processed images with the favorite location information to obtain at least three favorite-location comparison results, and the distinguish module statistically analyzes the comparison results and the favorite-location comparison results to obtain the distinguish result.

In one embodiment, the image pre-processing module includes a mask processing unit for performing an auto-detection with each of the brain images and selecting a position of the brain tumor so as to obtain a mask.

In one embodiment, the image pre-processing module further includes a partial image capturing unit for capturing a part of each of the brain images around the selected position to obtain a partial image.

In one embodiment, the processed image is the mask and/or the partial image.

In one embodiment, the server computing device further includes a distinguish result outputting module for outputting the distinguish result.

In one embodiment, the server computing device further includes a processor, and the processor executes the image receiving module, the image pre-processing module, the data comparison module, the distinguish module and the distinguish result outputting module.

In one embodiment, the brain tumor types distinguish system further includes a user computing device for receiving the distinguish result outputted from the server computing device.

In one embodiment, the server computing device analyzes a plurality of different types of brain tumor reference images to obtain the distinguish pathways.

To achieve the above, this disclosure further provides a server computing device. A brain tumor types distinguish system includes an image outputting device and the server computing device. The image outputting device outputs at least three brain images captured from a position of a brain tumor, and the server computing device pre-stores a plurality of distinguish pathways corresponding to different types of brain tumors. The server computing device includes an image receiving module, an image pre-processing module, a data comparison module and a distinguish module. The image receiving module receives the brain images. The image pre-processing module pre-processes the brain images to obtain corresponding processed images thereof. The data comparison module compares the brain images and the processed images with the distinguish pathways to obtain at least three comparison results. The distinguish module statistically analyzes the comparison results to obtain a distinguish result.

In one embodiment, the distinguish module includes a scoring unit and a distinguish unit. The scoring unit evaluates each of the comparison results to obtain a scoring result, and the distinguish unit statistically analyzes the scoring results to obtain the distinguish result.

In one embodiment, the comparison result comprises Vestibular Schwannoma, Meningioma, Pituitary Adenoma, Schwannoma, Glioma, or Metastasis.

In one embodiment, the scoring unit further performs a weighting process to the comparison result of Meningioma so as to obtain a weighted scoring result.

In one embodiment, the server computing device further pre-stores favorite location information of the different types of brain tumors, the data comparison module further compares the brain images and the processed images with the favorite location information to obtain at least three favorite-location comparison results, and the distinguish module statistically analyzes the comparison results and the favorite-location comparison results to obtain the distinguish result.

In one embodiment, the image pre-processing module includes a mask processing unit for performing an auto-detection with each of the brain images and selecting a position of the brain tumor so as to obtain a mask.

In one embodiment, the image pre-processing module further includes a partial image capturing unit for capturing a part of each of the brain images around the selected position to obtain a partial image.

In one embodiment, the processed image is the mask and/or the partial image.

In one embodiment, the server computing device further includes a distinguish result outputting module for outputting the distinguish result.

In one embodiment, the server computing device further includes a processor for executing the image receiving module, the image pre-processing module, the data comparison module, the distinguish module and the distinguish result outputting module.

In one embodiment, the server computing device analyzes a plurality of different types of brain tumor reference images to obtain the distinguish pathways.

To achieve the above objective, the present disclosure further provides a computer readable storage medium applied to a brain tumor types distinguish system and storing a program code, wherein the program code is executed by a processor of a computing device to implement the above-mentioned modules.

As mentioned above, the brain tumor types distinguish system of this disclosure can distinguish the type of brain tumor of patient based on the brain tumor images, and provide the distinguish result of the brain tumor type to medical staffs, so that the medical staffs can provide proper treatment methods for different patients, thereby improving the treatment effect.

BRIEF DESCRIPTION OF THE DRAWINGS

The disclosure will become more fully understood from the detailed description and accompanying drawings, which are given for illustration only, and thus are not limitative of the present disclosure, and wherein:

FIGS. 4A to 4C are schematic diagrams showing the images processed by the brain tumor types distinguish system of this disclosure, wherein FIG. 4A shows a brain image, and FIGS. 4B and 4C show processed images (the processed image as shown in FIG. 4B is a mask, and the processed image as shown in FIG. 4C is a partial image).

DETAILED DESCRIPTION OF THE DISCLOSURE

Figure 1A:
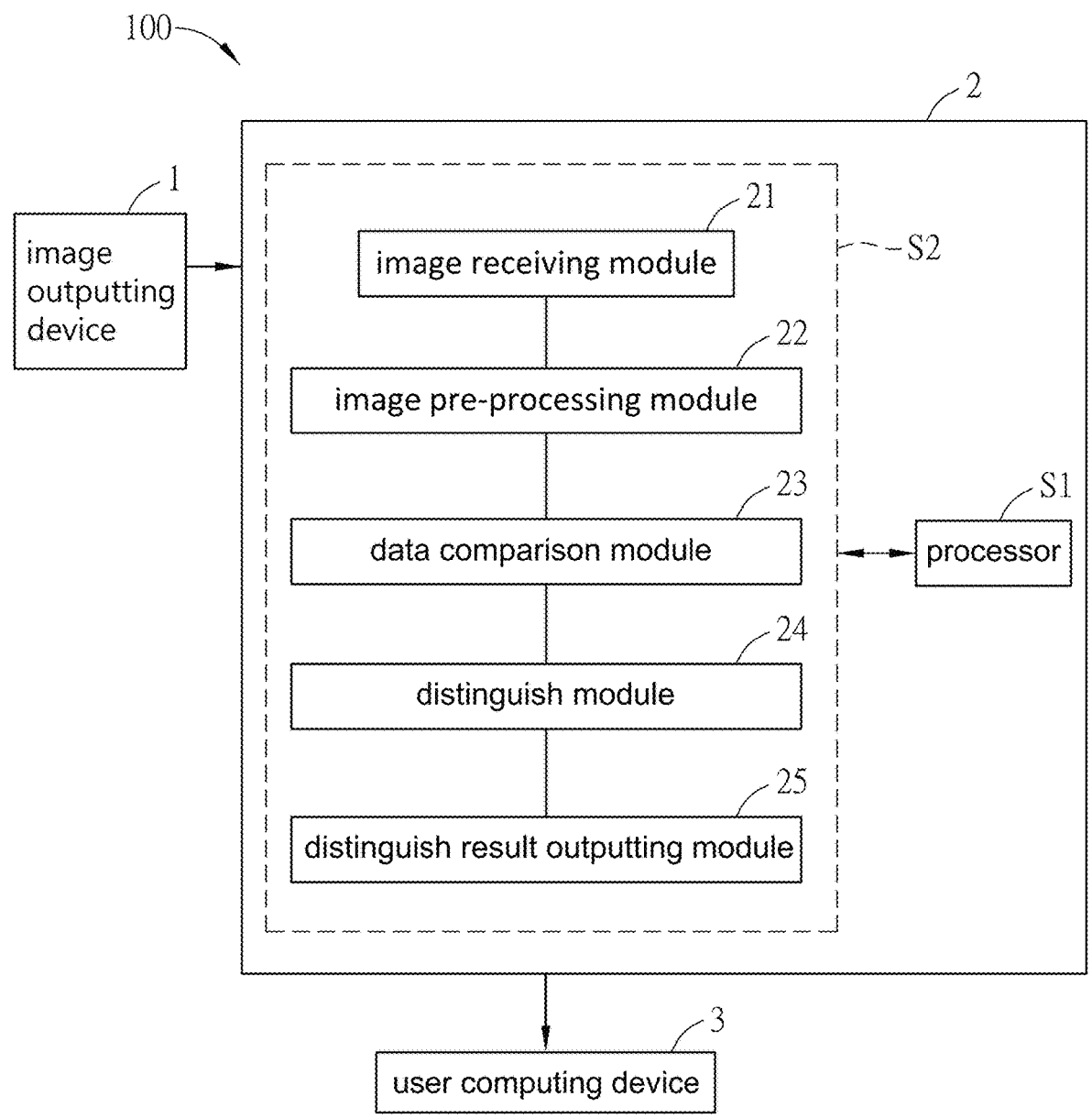
FIG. 1A is a schematic diagram showing a brain tumor types distinguish system according to an embodiment of this disclosure.

The present disclosure will be apparent from the following detailed description, which proceeds with reference to the accompanying drawings, wherein the same references relate to the same elements.

The brain tumor types distinguish system of this disclosure can distinguish the type of brain tumor of patient based on the brain tumor images, and provide the distinguish result of the brain tumor type to medical staffs, so that the medical staffs can provide proper treatment methods for different patients, thereby improving the treatment effect.

Unless otherwise defined, all technical and scientific terms used herein have the same meaning as understood by one of ordinary skill in the art of this invention. The preferred materials and methods are described herein, but it should be understood that any methods and materials similar or equivalent to those described herein can be used in the testing experiments of the present disclosure. In describing and claiming the present disclosure, the following terminology will be used. It should be understood that the terminology used herein is for the purpose of describing particular embodiments only and not for the purpose of limiting the invention.

The term "brain tumor" refers to the tumor occurring in the brain, not limited to benign or malignant tumors, such as for example but not limited to Vestibular Schwannoma, Meningioma, Pituitary Adenoma, Schwannoma, Glioma, or Metastasis. The term "brain tumor" may also be referred to simply as "tumor" herein.

The term "VGG16 model" refers to a deep learning model derived from a convolutional neural network (CNN), which is used to identify the content in images, especially for the identification of medical images. The examples of using VGG16 model to identify medical images have been disclosed in "Transfer Learning Using Convolutional Neural Network Architectures for Brain Tumor Classification from MRI Images" (Chelghoum, R et al., 2020. Cham: Springer International Publishing). In this article, the VGG16 model architecture consists of thirteen convolution layers, followed by three fully connected (FC) layers. All the hidden layers use ReLU as the activation function, instead of the last FC layer, which is passed to softmax function to normalize the results.

The term "modified VGG16 model" refers to a modified model of "VGG16 model". In the present disclosure, the modified VGG16 model consists of thirteen convolution layers, with one fully connected (FC) layer and one global average pooling (GAP) layer. In the modified VGG16 model, batch normalization is added after all convolutional layers, followed by one fully connected (FC) layer and one global average pooling (GAP) layer. Finally, the result is normalized by Softmax function. The modified VGG16 model of the present disclosure can make the process of distinguishing images smoother, and can also reduce the spatial parameters used in deep learning, so that the model can be more stable.

The term "Data Augmentation" refers to the rotation and flipping of images to generate data-augmented images for training the "modified VGG16 model". Here, each image is rotated with an angle between −10° and 10°, and the random integer was taken from a discrete uniform distribution; or each image is flipped along the Y-axis of the image, the left-right flipping, with a probability of 0.5%.

FIG. 1A is a schematic diagram showing a brain tumor types distinguish system 100 according to an embodiment of this disclosure. Referring to FIG. 1A, in this embodiment, the brain tumor types distinguish system 100 includes an image outputting device 1 and a server computing device 2.

Figure 4A:
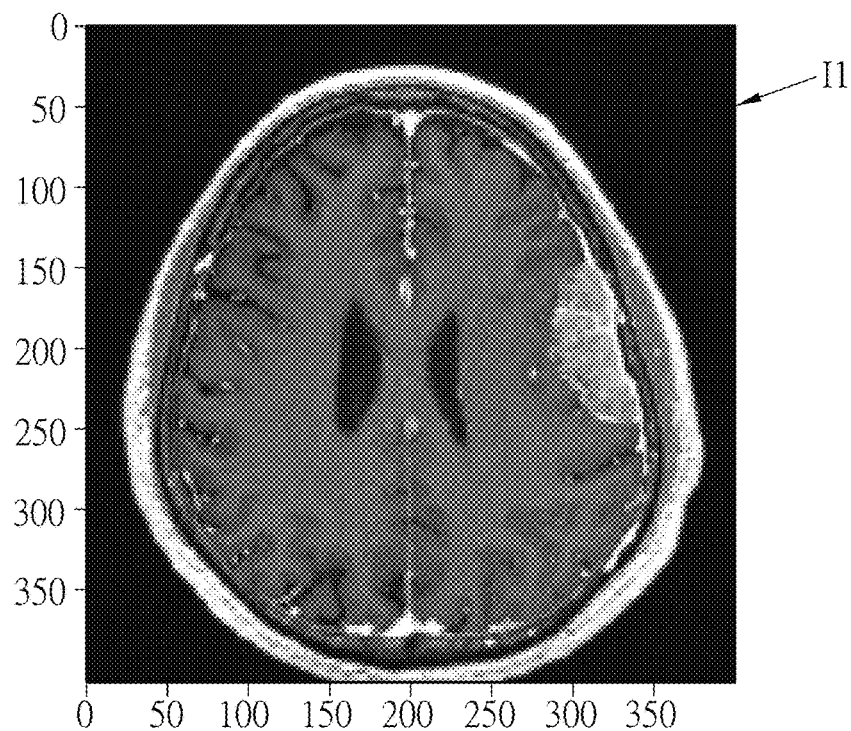
Figure 4B:
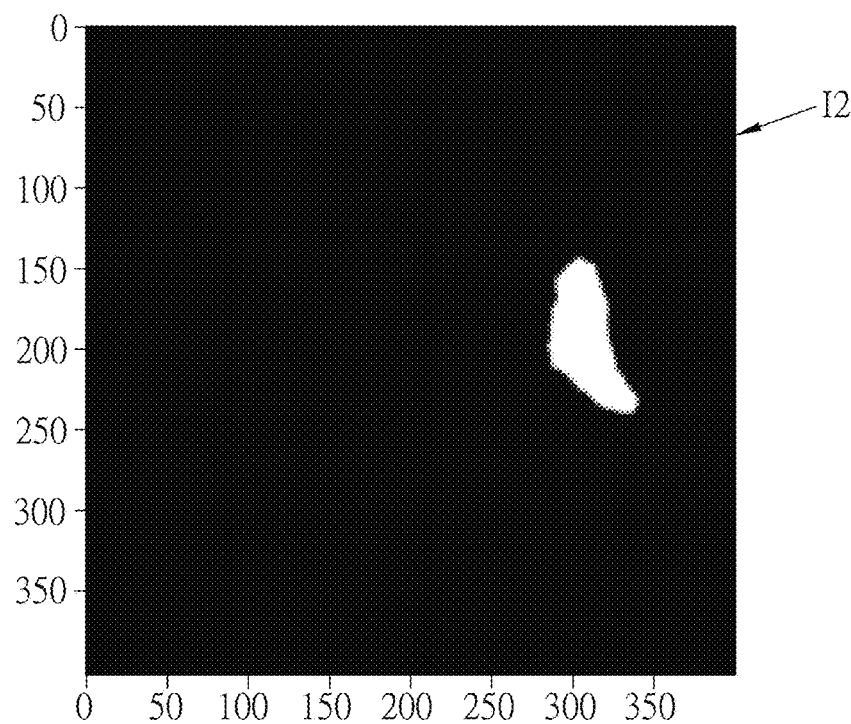
Figure 4C:
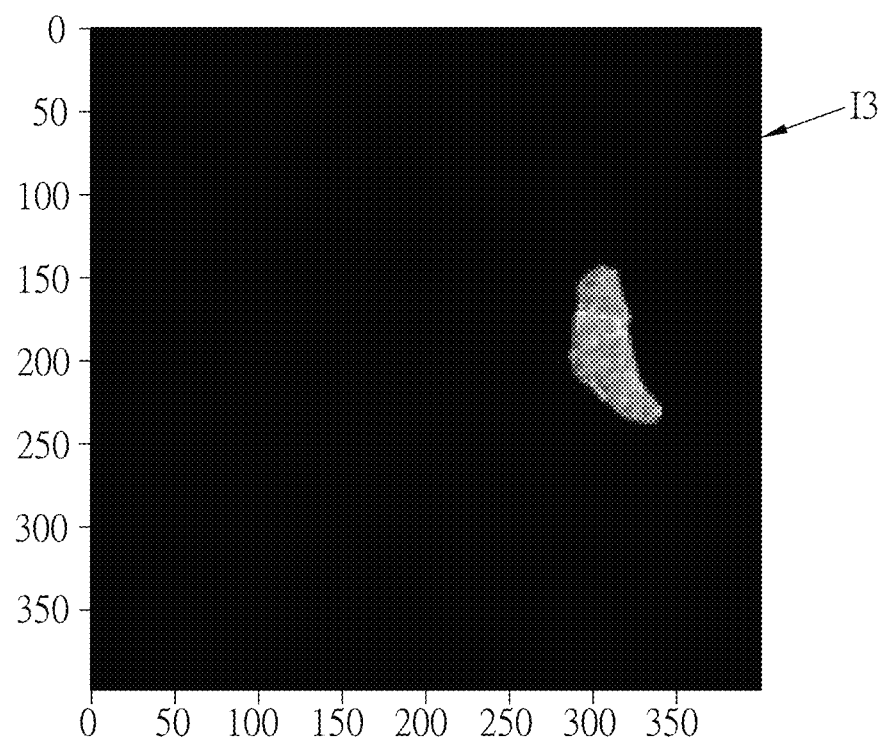

FIGS. 4A to 4C are schematic diagrams showing the images processed by the brain tumor types distinguish system 100 of this disclosure. Referring to FIGS. 1A and 4A (FIG. 4A shows a brain image), the image outputting device 1 is used to output at least three brain images I1 captured from a position of a brain tumor. The brain tumor can be, for example but not limited to, Vestibular Schwannoma, Meningioma, Pituitary Adenoma, Schwannoma, Glioma, or Metastasis. The brain images I1 are MRI (Magnetic Resonance Imaging) images. Specifically, the three brain images I1 captured at the location of the brain tumor are brain images of at least three different slices obtained at the location of the brain tumor using an MRI apparatus such as, for example but not limited to, T1-weighted (T1W) image, T2-weighted (T2W) image, or T1-weighted gadolinium contrast enhanced (T1W+C) image.

As shown in FIG. 1A, the server computing device 2 of this embodiment includes an image receiving module 21, an image pre-processing module 22, a data comparison module 23, and a distinguish module 24. The server computing device 2 pre-stores a plurality of distinguish pathways corresponding to different types of brain tumors. For example, the distinguish pathways can be stored in the database or any module of the server computing device 2 (e.g. the data comparison module 23). The server computing device 2 analyzes a plurality of different types of brain tumor reference images to obtain the distinguish pathways. The types of brain tumors can refer to the above description, so the details thereof will be omitted here. Specifically, the server computing device 2 can utilize the modified VGG16 modules to analyze a plurality of different types of brain tumor reference images, generate the distinguish pathways corresponding to different types of brain tumors, and then store the generated distinguish pathways in the server computing device 2. Afterwards, the server computing device 2 can analyze and determine that the target brain image I1 matches (or close to) which one of the distinguish pathways so as to obtain the distinguish result of the brain tumor type. The detailed process will be described hereinbelow.

In other embodiments, the server computing device 2 further pre-stores favorite location information of the different types of brain tumors. For example, the favorite location information can be stored in the database or any module of the server computing device 2 (e.g. the data comparison module 23). The server computing device 2 analyzes a plurality of different types of brain tumor reference images to obtain the favorite location information. Otherwise, the favorite location information can be the standard favorite location images of different types of brain tumors. The types of brain tumors can refer to the above description, so the details thereof will be omitted here.

The functions of different modules will be explained hereinafter with reference to FIGS. 1A and 4A to 4C. FIGS. 4B and 4C show the processed images, wherein the processed image as shown in FIG. 4B is a mask, and the processed image as shown in FIG. 4C is a partial image.

As shown in FIGS. 1A and 4A, the image receiving module 21 receives the at least three brain images I1, which are captured from the position of a brain tumor and outputted by the image outputting device 1.

Figure 1B:
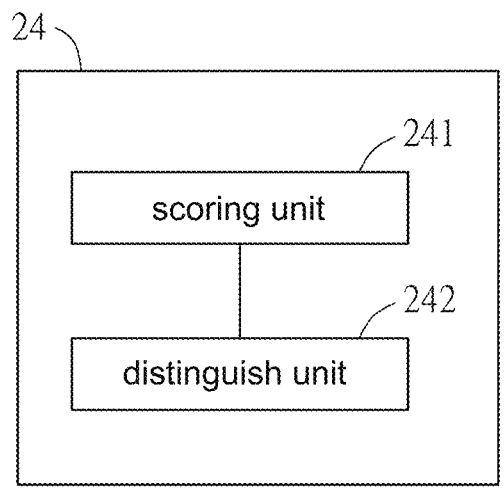
FIG. 1B is a schematic diagram showing a distinguish module of FIG. 1A.
Figure 1C:
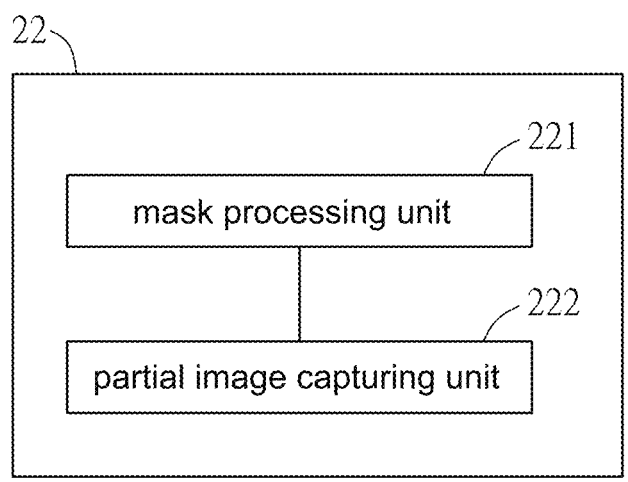
FIG. 1C is a schematic diagram showing an image pre-processing module of FIG. 1A.

FIG. 1C is a schematic diagram showing the image pre-processing module 22 of FIG. 1A. Referring to FIGS. 1A, 1C and 4A to 4C, the image pre-processing module 22 pre-processes the brain images I1 to obtain corresponding processed images thereof. Specifically, with reference to FIGS. 1A and 1C, the image pre-processing module 22 includes either one or both of a mask processing unit 221 and a partial image capturing unit 222. The mask processing unit 221 is configured to perform an auto-detection with each of the brain images I1 and select a position of the brain tumor so as to obtain the corresponding mask I2. The partial image capturing unit 222 is configured to capture a part of each of the brain images I1 around the selected position of the brain tumor to obtain a corresponding partial image I3. That is, the processed image can be either one or both of the mask I2 and the partial image I3.

Referring to FIGS. 1A and 4A to 4C, the data comparison module 23 compares the brain images I1 and the processed images (either one or both of the mask I2 and the partial image I3) with the distinguish pathways to obtain at least three comparison results. Specifically, the data comparison module 23 adopts the modified VGG16 module to compare the brain images I1 and the processed images (either one or both of the mask I2 and the partial image I3) with the distinguish pathways, and determines that each brain image I1 and the processed image thereof match (or close to) which one of the distinguish pathways. For example, if the data comparison module 23 determines that the brain image I1 and the processed image thereof match (or close to) the distinguish pathway of Vestibular Schwannoma, the corresponding comparison result is Vestibular Schwannoma. If the data comparison module 23 determines that the brain image I1 and the processed image thereof match (or close to) the distinguish pathway of Meningioma, the corresponding comparison result is Meningioma. In particular, the number of the comparison results is corresponding to the number of the brain images I1. That is, if the image outputting device 1 outputs three brain images I1, the data comparison module 23 will obtain three comparison results.

FIG. 1B is a schematic diagram showing the distinguish module 24 of FIG. 1A. Referring to FIGS. 1A, 1B and 4A to 4C, in this embodiment, the distinguish module 24 statistically analyzes the comparison results to obtain a distinguish result. Specifically, the distinguish module 24 includes a scoring unit 241 and a distinguish unit 242. The scoring unit 241 evaluates each of the comparison results to obtain a scoring result. The distinguish unit 242 statistically analyzes the scoring results to obtain the distinguish result. For example, when the image outputting device outputs five brain images I1 captured from the position of a brain tumor, and the data comparison module 23 performs the comparison and determines that three of the brain images I1 and the processed images thereof (either one or both of the mask I2 and the partial images I3) are Vestibular Schwannoma and two of the brain images I1 and the processed images thereof (either one or both of the mask I2 and the partial images I3) are Pituitary Adenoma, the scoring unit 241 evaluates the comparison results to obtain the scoring results, wherein Vestibular Schwannoma gets 3 points, and Pituitary Adenoma gets 2 points. Then, the distinguish unit 242 statistically analyzes the scoring results to realize that the score of Vestibular Schwannoma is greater than the score of Pituitary Adenoma, and thus determines that the distinguish result is Vestibular Schwannoma, thereby distinguishing the tumor in the brain image I1 as Vestibular Schwannoma. In another example, when the image outputting device outputs five brain images I1 captured from the position of a brain tumor, and the data comparison module 23 performs the comparison and determines that three of the brain images I1 and the processed images thereof (either one or both of the mask I2 and the partial images I3) are Vestibular Schwannoma and two of the brain images I1 and the processed images thereof (either one or both of the mask I2 and the partial images I3) are Meningioma, the scoring unit 241 evaluates the comparison results and weights the comparison result of Meningioma. In this case, the scoring result of Vestibular Schwannoma is 3 points, the scoring result of Meningioma is 2 points, and the weighted scoring result of Meningioma is 2 points. Herein, the weighting calculation uses the following equation of: (number of brain images)× threshold value=(weighted scoring result). Since the number of brain images is 5 and the threshold value is 0.4, the weighted scoring result of Meningioma is (5×0.4=2). Then, the distinguish unit 242 statistically analyzes the scoring results to realize that the score of Vestibular Schwannoma is greater than the score of Meningioma but the score of Meningioma reaches the weighted score of Meningioma, and thus determines that the distinguish result is Meningioma, thereby distinguishing the tumor in the brain image I1 as Meningioma. In other words, once the comparison result of brain image is Meningioma, the scoring unit 241 can generate a score based on the original comparison result and a weighted scoring result, and the distinguish unit 242 can analyze the scoring result of Meningioma and the weighted scoring result of Meningioma and determine whether the scoring result of Meningioma is greater than or equal to the weighted scoring result of Meningioma. If the scoring result of Meningioma is greater than or equal to the weighted scoring result of Meningioma, the brain image is distinguished as Meningioma. If the scoring result of Meningioma is less than the weighted scoring result of Meningioma, the distinguish unit 242 will analyze the original scoring results. In this case, the distinguish unit 242 analyzes original scoring results and determines that the score of Vestibular Schwannoma is greater than that of Meningioma, thereby distinguishing the brain image to be Vestibular Schwannoma. To be noted, the number of brain images and threshold value of this embodiment are for an illustration only, and are not for limiting the scope of this disclosure.

In addition, when the server computing device 2 further pre-stores the favorite location information of different types of brain tumors, the data comparison module 23 can further compare each brain image I1 and the processed image thereof (either one or both of the mask I2 and the partial image I3) with the favorite location information so as to obtain at least three favorite-location comparison results. Then, the distinguish module 24 statistically analyzes the comparison results and the favorite-location comparison results to obtain the distinguish result. Specifically, the data comparison module 23 of the server computing device 2 can compare each brain image I1 and the processed image thereof (either one or both of the mask I2 and the partial image I3) with the favorite location information so as to locate the position of tumor in each brain image I1 and the processed image thereof (either one or both of the mask I2 and the partial image I3). Afterwards, the data comparison module 23 determines each brain image I1 and the processed image thereof (either one or both of the mask I2 and the partial image I3) match (or close to) which one of the favorite location information of the brain tumor according to the location result, so as to obtain the favorite-location comparison result. The distinguish module 24 performs the distinguish process based on the favorite-location comparison result and the above-mentioned comparison result to obtain a more accurate distinguish result. For example, the favorite location of Pituitary Adenoma is pituitary gland, so the favorite location information of Pituitary Adenoma is the image of pituitary gland or the standard favorite location image of Pituitary Adenoma. When the data comparison module 23 compares each brain image I1 and the processed image thereof (either one or both of the mask I2 and the partial image I3) with the favorite location information so as to locate the position of tumor in each brain image I1 and the processed image thereof (either one or both of the mask I2 and the partial image I3), and determines that the location result matches the favorite location information of Pituitary Adenoma, the comparison result indicates the favorite location of Pituitary Adenoma. Then, the distinguish module 24 performs the distinguish process based on the favorite-location comparison result (indicating the favorite location of Pituitary Adenoma) and the above-mentioned comparison result to obtain a more accurate distinguish result.

Referring to FIG. 1A, in this embodiment, the server computing device 2 can further include a distinguish result outputting module 25 for outputting the distinguish result. In this embodiment, the distinguish result can be, for example but not limited to, Vestibular Schwannoma, Meningioma, Pituitary Adenoma, Schwannoma, Glioma, or Metastasis.

Referring to FIG. 1A, in this embodiment, the server computing device 2 further includes a processor S1, and the processor S1 can execute the image receiving module 21, the image pre-processing module 22, the data comparison module 23, the distinguish module 24 and the distinguish result outputting module 25 for implementing the above-mentioned processes.

Referring to FIG. 1A, in this embodiment, the brain tumor types distinguish system 100 further includes a user computing device 3 for receiving the distinguish results outputted from the server computing device 2.

Figure 2:
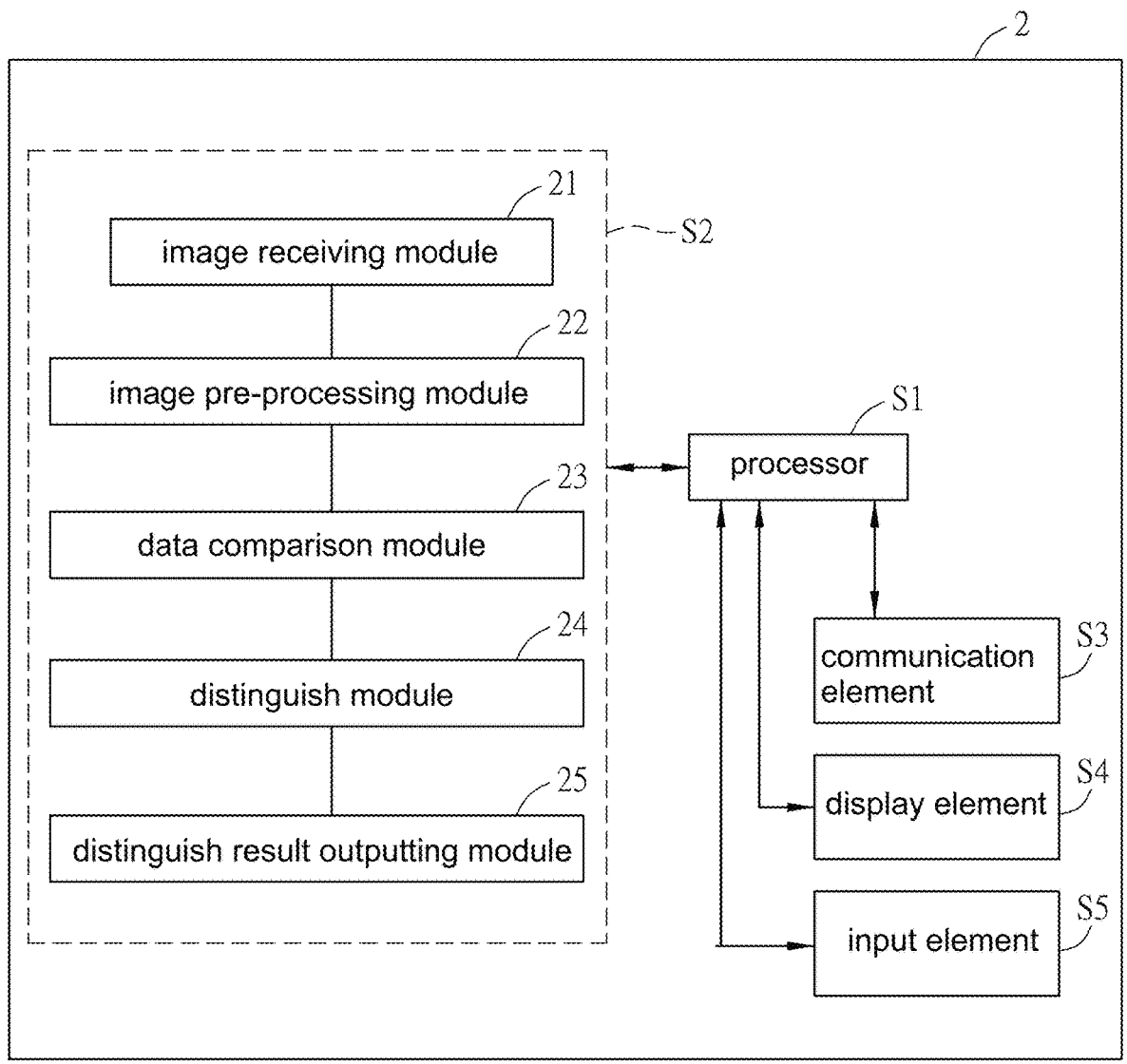
FIG. 2 is a schematic diagram showing a server computing device of the brain tumor types distinguish system of this disclosure.

FIG. 2 is a schematic diagram showing a server computing device 2 of the brain tumor types distinguish system 10 of this disclosure. With reference to FIG. 2 in view of FIG. 1A, the server computing device 2 is applied to a brain tumor types distinguish system 100. The brain tumor types distinguish system 100 includes an image outputting device 1 and the server computing device 2. The server computing device 2 includes the above-mentioned modules and pre-stores a plurality of distinguish pathways corresponding to different types of brain tumors. The method for obtaining the distinguish pathways and the processes and functions of the modules can refer to the above embodiment, so the detailed descriptions thereof will be omitted here.

As shown in FIG. 2, the server computing device 2 further includes a computer readable storage medium S2, a communication element S3, a display element S4, an input element S5, and a housing (not shown). For example, the server computing device 2 can be a server, a mobile phone, a tablet computer, a laptop computer, a desktop computer or any of other computer devices. Each of the server, mobile phone, tablet computer, laptop computer and desktop computer includes a housing for accommodating the processor S1, the computer readable storage medium S2, and the communication element S3. The display element S4 and the input element S5 of each of the mobile phone, tablet computer and laptop computer are installed on the housing, but the display element S4 and the input element S5 of each of the server and desktop computer can be individual components connected to the host.

The processor S1 is coupled to the computer readable storage medium S2, the communication element S3, the display element S3, and the input element S5, and is configured to execute the image receiving module 21, the image pre-processing module 22, the data comparison module 23, the distinguish module 24 and the distinguish result outputting module 25. The process S1 can be any processor that can execute the modules (e.g. modules, program codes or instructions). The server computing device 2 can include one or more processors S1, and each processor S1 may include one or more cores. The computer readable storage medium S2 includes RAM or non-volatile computer readable storage medium (such as HD, SSD, flash memory, etc.), which stores the modules (e.g. modules, program codes or instructions) to be executed by the processor S1. The processor S1 can load the modules (e.g. modules, program codes or instructions) from the non-volatile computer readable storage medium to the RAM and then execute the loaded modules. The communication element S3 can be, for example, a network card, a network chip, a modem, and any of other devices that can provide network connections. The display element S4 includes a display card, a display chip, a display device, or the likes, and the input element S5 is, for example, a keyboard, a mouse, a touch screen, or the likes.

In the above embodiment, the image receiving module 21, the image pre-processing module 22, the data comparison module 23, the distinguish module 24 and the distinguish result outputting module 25 are stored in the computer readable storage medium S2 in the software form, and the processor S1 of the computer device can access the computer readable storage medium S2 to execute the modules. To be noted, the image receiving module 21, the image pre-processing module 22, the data comparison module 23, the distinguish module 24 and the distinguish result outputting module 25 can also be stored in the RAM (not shown) of the processor S1 in the software form. Otherwise, the image receiving module 21, the image pre-processing module 22, the data comparison module 23, the distinguish module 24 and the distinguish result outputting module 25 can be provided in the hardware form (for example but not limited to ASIC), which can be coupled to the processor S1 for executing the functions thereof. Alternatively, the image receiving module 21, the image pre-processing module 22, the data comparison module 23, the distinguish module 24 and the distinguish result outputting module 25 can be provided in the firmware form, such as the software embedded in the ASIC (not shown). This disclosure is not limited thereto.

In addition, the user computing device 3 may also include a processor, a computer readable storage medium, a communication element, a display element, an input element, and a housing (not shown). For example, the user computing device 3 can be a mobile phone, a tablet computer, a laptop computer, a desktop computer or any of other computer devices. Each of the mobile phone, tablet computer, laptop computer and desktop computer includes a housing for accommodating the processor, the computer readable storage medium and the communication element. The display element and the input element of each of the mobile phone, tablet computer and laptop computer are installed on the housing, but the display element and the input element of the desktop computer can be individual components connected to the host. The user computing device 3 may communicate with the server computing device 2 through, for example but not limited to, network for receiving the distinguish result outputted from the server computing device 2.

Figure 3:
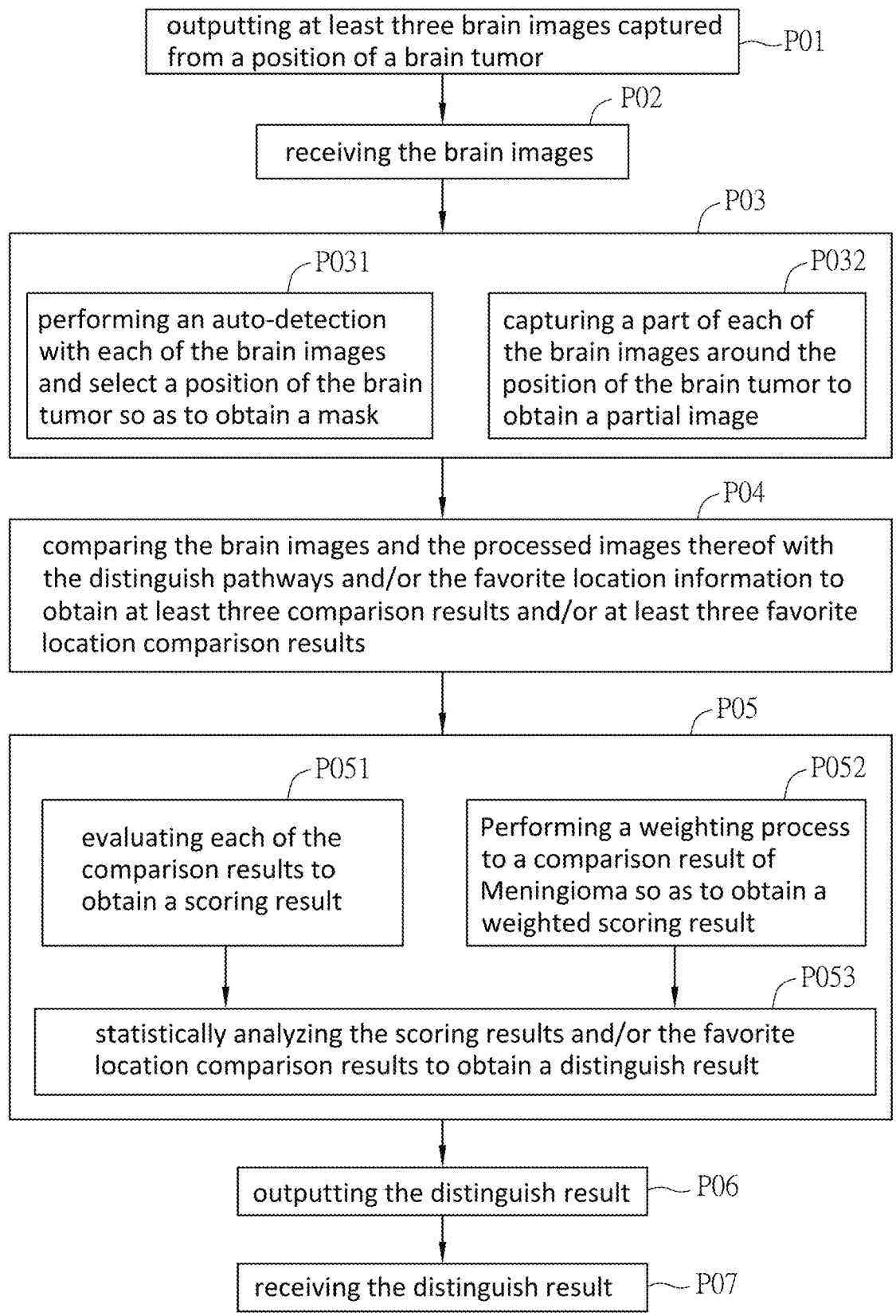
FIG. 3 is a schematic diagram showing the implement steps of the brain tumor types distinguish system of this disclosure.

The operation of the brain tumor types distinguish system 100 will be described hereinafter with reference to FIG. 3 in view of FIGS. 1A to 1C and 4A to 4C. FIG. 3 is a schematic diagram showing the implement steps of the brain tumor types distinguish system 100 of this disclosure.

First, the image outputting device 1 outputs at least three brain images I1, which are captured from a position of a brain tumor, to the server computing device 2 (step P01).

Next, the image receiving module 21 of the server computing device 2 receives the brain images I1 from the image outputting device 1 (step P02). The image pre-processing module 22 of the server computing device 2 pre-processes the brain images I1 to obtain corresponding processed images thereof (the processed image can be either one or both of the mask I2 and the partial image I3) (step P03). Herein, the image pre-processing module 22 may perform an auto-detection with each of the brain images I1 and select a position of the brain tumor so as to obtain a mask I2 (step P031); and/or capture a part of each of the brain images I1 around the position of the brain tumor to obtain a partial image I3 (step P032).

Afterwards, the data comparison module 23 of the server computing device 2 compares the brain images I1 and the processed images thereof (either one or both of the mask I2 and the partial image I3) with the distinguish pathways and/or the favorite location information to obtain at least three comparison results and/or at least three favorite location comparison results (step P04). Then, the distinguish module 24 of the server computing device 2 statistically analyzes the comparison results and/or the favorite location comparison results to obtain a distinguish result (step P05). In this embodiment, the distinguish module 24 includes a scoring unit 241 and a distinguish unit 242. The scoring unit 241 evaluates each of the comparison results to obtain a scoring result (step P051). The distinguish unit 242 statistically analyzes the scoring results to obtain the distinguish result (step P053). To be noted, when the comparison result is Meningioma, the scoring unit 241 further performs a weighting process to the comparison result of Meningioma so as to obtain the weighted scoring result (step P052).

Then, the distinguish result outputting module 25 of the server computing device 2 outputs the distinguish result to the user computing device 3 (step P06). Finally, the user computing device 3 receives the distinguish result outputted from the server computing device 2 (step P07).

In brief, the image outputting device 1 outputs the brain images I1 captured from a position of a brain tumor to the server computing device 2, and the modules of the server computing device 2 process the received brain images I1 to obtain the distinguish result, which is then outputted to the user computing device 3. In this embodiment, the image outputting device 1 can be any device that can store and output images such as a USB (Universal Serial Bus) port, a CD-ROM, a floppy disk, a computer device, or an MRI apparatus. Examples of the server computing device 2 and the user computing device 3 have been described in detail above, and the detailed descriptions thereof will be omitted here.

Experimental Examples

Reference Image Database

The reference images used were retrospectively collected during 2000-2017 from Taipei Veterans General Hospital, Taiwan. The study protocol was approved by the Institutional Review Board of Taipei Veterans General Hospital. The dataset includes seven classes, six types of brain tumors and the remaining class is normal case (those without brain tumors). The brain images are MRI images (T1-weighted contrast-enhanced (T1W+C) images), which are retrieved by 1.5-T MR scanner (GE Medical System). These brain images are identified and distinguished by experienced neuroradiologists to determine the types of brain tumors in these brain images. Table 1 lists the number of patients with various types of brain tumors.

TABLE 1 number of patients with various types of brain tumors (from reference image database)

| Tumor Types | Number of Patients |
|---|---|
| Vestibular Schwannoma | 560 |
| Glioma | 159 |
| Meningioma | 877 |
| Metastasis | 590 |
| Pituitary Adenoma | 135 |
| Schwannoma | 117 |
| Normal* | 540 |

*Normal indicates no tumor is found in the brain image of patient

As shown in Table 1, it lists numbers of patients with six different types of brain tumors, wherein there are 560 patients with Vestibular Schwannoma, 159 patients with Glioma, 877 patients with Meningioma, 590 patients with Metastasis, 135 patients with Pituitary Adenoma, 117 patients with Schwannoma, and 540 normal patients (which means that the brain images of these patients have no tumor).

Processing Method of Patient's Brain Images in Reference Image Database

All the aforementioned patients are respectively subjected to capture at least one MRI image, and the MRI images are pre-stored in a server computing device. Then, these MRI images are pre-processed to reduce differences in image parameters and improve the reliability of subsequent analysis.

Above all, the MRI images pre-stored in the server computing device are padded to square and cropped out the brain region. Afterwards, the mask is generated corresponding to the position of tumor, and the partial image of tumor is cropped out along the edge of tumor.

To be noted, because the tumor is a 3D structure, its MRI image is a 3D image. In this 3D image, multiple slice images (2D images) can be generated according to different depths. The reference images used in this experimental example are 2D images of different depths obtained from the 3D images of patients. For example, the image of a patient's tumor obtained by MRI imaging can be a 3D image, and it can generate, for example but not limited to, 20 2D slice images according to different depths of the tumor. In this case, all of these 20 2D slice images can be used as the reference images of the patient. If the total number of images was greater than 20, we first found the middle one in the whole volume and took one-third of the total number of images from the middle to the two sides, so that the images taken out will be the middle two-thirds of the images. For example, if totally 60 2D slice images are generated, the middle image is the 30th 2D slice image, and ⅓ of the slice images in front of the 30th 2D slice image (i.e. the 10th to 29th 2D slice images) and ⅓ of the slice images behind the 30th 2D slice image (i.e. the 31st to 50th 2D slice images) are also taken as the reference images. In other words, the reference images generated from this patient are the 10th to 50th slice images of the MRI image, and these slice images are 2D images.

Number of Reference Images in Reference Image Database

Since at least one reference image can be generated based on one MRI image of a patient, the numbers of reference images corresponding to different types of brain tumors can be classified as shown in Table 2.

TABLE 2 number of reference images of various types of brain tumors (from reference image database)

| Tumor Types | Number of Reference images |
|---|---|
| Vestibular Schwannoma | 3367 |
| Glioma | 4397 |
| Meningioma | 17325 |
| Metastasis | 6944 |
| Pituitary Adenoma | 2436 |
| Schwannoma | 2505 |
| Normal* | 27697 |
| Total | 64671 |

*Normal indicates no tumor is found in the reference image

Establish of Distinguish Pathways

Next, the "modified VGG16 model" is trained with the aforementioned reference images, so that it can generate the distinguish pathways based on the characteristics of the images and the corresponding tumor types, which can be used to automatically distinguish the tumor types of subsequent newly input brain images.

Training Method of "Modified VGG16 Model"

To be noted, because the numbers of reference images for different types of brain tumors are different, three different training methods for model learning are used in this experimental example, which are described in detail as follows:

Training method A: using all the reference images in the model leaning of "modified VGG16 model", and the training process is repeatedly performed.

Training method B: using the number of reference images of Pituitary Adenoma (the fewest samples) as a reference amount, and randomly sampling a number of reference images (equal to the reference amount) from the reference images of each of other types of brain tumors for training the "modified VGG16 model". For example, the reference images of each type of brain tumors are randomly sampled with 1500 data for training the "modified VGG16 model". This method can improve the accuracy of the "modified VGG16 model". In this case, the reference amount of images is for illustration only, and other amounts can be used for the model learning, as long as the reference amount is less than or equal to the number of reference images of the type of brain tumor with fewest samples (i.e. Pituitary Adenoma). The reference images used for each training can be randomly re-sampled from the reference images of different types of brain tumors.

Training method C: similar to the training method B, but equal amount of data is sampled in advance from the reference images of each type of brain tumors and used throughout the experiments (only sampling for once).

Table 3 shows the sensitivities of distinguishing different types of brain tumors with different training methods.

TABLE 3 comparison of sensitivities of distinguishing different types of brain tumors with different training methods

| Training method | Sensitivity of distinguishing different types of brain tumors | | | | | | | |
|---|---|---|---|---|---|---|---|---|
| | VS | G | M | Mets | PA | S | N | Average |
| A | 80.14% | 43.73% | 65.09% | 97.52% | 69.82% | 52.76% | 97.37% | 72.35% |
| B | 97.92% | 56.76% | 53.90% | 96.11% | 89.19% | 95.28% | 73.10% | 80.32% |
| C | 96.30% | 62.90% | 51.69% | 97.17% | 92.12% | 82.68% | 83.55% | 80.92% |

VS: Vestibular Schwannoma;
G: Glioma;
M: Meningioma;
Mets: Metastasis;
PA: Pituitary Adenoma;
S: Schwannoma;
N: Normal (no tumor)

As shown in Table 3, the training method B and the training method C have higher sensitivities, so these two training methods in cooperated with "data augmentation" are used to train the "modified VGG16 model", thereby improving the sensitivity of the system in distinguishing types of brain tumors. The comparison result of the sensitivities of distinguishing different types of brain tumors using the training methods with or without "data augmentation" is listed in the following Table 4.

TABLE 4 comparison of sensitivities of distinguishing different types of brain tumors using the training methods with or without "data augmentation"

| Training method | Augmentation | Sensitivity of distinguishing different types of brain tumors | | | | | | | |
|---|---|---|---|---|---|---|---|---|---|
| | | VS | G | M | Mets | PA | S | N | Average |
| B | No | 97.92% | 56.76% | 53.90% | 96.11% | 89.19% | 95.28% | 73.10% | 80.32% |
| | Yes | 97.23% | 67.57% | 59.04% | 97.17% | 87.39% | 77.95% | 85.21% | 81.65% |
| C | No | 96.30% | 62.90% | 51.69% | 97.17% | 92.12% | 82.68% | 83.55% | 80.92% |
| | Yes | 97.46% | 68.30% | 47.16% | 90.92% | 90.09% | 75.59% | 72.98% | 77.50% |

VS: Vestibular Schwannoma;
G: Glioma;
M: Meningioma;
Mets: Metastasis;
PA: Pituitary Adenoma;
S: Schwannoma;
N: Normal (no tumor)

Table 4 indicates that the training method B in cooperate with "data augmentation" can achieve the optimum sensitivity when using the "modified VGG16 model" to distinguish different types of brain tumors. As a result, this disclosure uses the training method B to train the "modified VGG16 model" (data learning).

Selection of Brain Image Types

As described in the above embodiment, each reference image has its corresponding mask and partial image, and after using the "modified VGG16 model" to analyze different images, the sensitivities of distinguishing different types of brain tumors also varies. The statistical results are shown in the following Table 5.

TABLE 5 comparison of sensitivities of distinguishing different types of brain tumors with different brain images

| Image types | Sensitivity of distinguishing different types of brain tumors | | | | | | | |
|---|---|---|---|---|---|---|---|---|
| | VS | G | M | Mets | PA | S | N | Average |
| Reference image | 97.23% | 67.57% | 59.05% | 97.17% | 87.39% | 77.95% | 85.21% | 81.65% |
| Reference image + Mask | 97.46% | 89.68% | 63.90% | 98.11% | 97.30% | 98.43% | 99.91% | 92.11% |
| Reference image + Partial image | 97.69% | 84.52% | 73.83% | 96.34% | 98.87% | 99.21% | 99.97% | 92.92% |

VS: Vestibular Schwannoma;
G: Glioma;
M: Meningioma;
Mets: Metastasis;
PA: Pituitary Adenoma;
S: Schwannoma;
N: Normal (no tumor)

Table 5 indicates that when inputting "the reference images and mask" or "the reference images and partial image" for the server computing device to analyze, the sensitivities of distinguishing different types of brain tumors are higher than (10~12% higher) the case using only the reference images for analyzing. However, Table 5 also indicates that the distinguish result of Meningioma has obvious lower sensitivity than other types of brain tumors, so it is a subjective to improve the distinguish sensitivity to Meningioma.

Using Weighted Voting to Improve Distinguish Sensitivity of Meningioma

The weighted voting method is applied to the comparison results of Meningioma obtained by the method of the previous embodiment so as to obtain the weighted scoring results. The sensitivities of distinguishing different types of brain tumors with the weighted scoring results and the original scoring results are shown in the following Table 6.

TABLE 6 comparison of sensitivities of distinguishing different types of brain tumors with or without the weighted scoring results

| Image type | weighted | Sensitivity of distinguishing different types of brain tumors | | | | | | | |
|---|---|---|---|---|---|---|---|---|---|
| | | VS | G | M | Mets | PA | S | N | Average |
| Reference image | No | 98.57% | 68.75% | 52.85% | 98.63% | 100.00% | 85.71% | 98.59% | 86.16% |
| Reference image | Yes | 98.57% | 62.50% | 56.91% | 98.63% | 95.24% | 85.71% | 98.59% | 85.17% |
| Reference image + Mask | No | 98.57% | 93.75% | 61.79% | 98.63% | 100.00% | 100.00% | 100.00% | 93.25% |
| Reference image + Mask | Yes | 98.57% | 93.75% | 64.23% | 98.63% | 100.00% | 100.00% | 100.00% | 93.60% |

TABLE 6-continued comparison of sensitivities of distinguishing different types of brain tumors with or without the weighted scoring results

| Image type | weighted | Sensitivity of distinguishing different types of brain tumors | | | | | | | |
|---|---|---|---|---|---|---|---|---|---|
| | | VS | G | M | Mets | PA | S | N | Average |
| Reference image + Mask | No | 98.57% | 93.75% | 73.17% | 98.63% | 100.00% | 100.00% | 100.00% | 94.87% |
| | Yes | 98.57% | 93.75% | 76.42% | 98.63% | 100.00% | 100.00% | 100.00% | 95.34% |

VS: Vestibular Schwannoma;
G: Glioma;
M: Meningioma;
Mets: Metastasis;
PA: Pituitary Adenoma;
S: Schwannoma;
N: Normal (no tumor)

Table 6 indicates that when inputting "the reference images and mask" or "the reference images and partial image" for the server computing device to analyze, the sensitivities of distinguishing different types of brain tumors are higher than the case using only the reference images for analyzing. If the scoring unit further performs a weighting process to the comparison result of Meningioma, the sensitivity of distinguishing Meningioma can be further improved, thereby increasing the average sensitivity of distinguishing different types of brain tumors of the brain tumor types distinguish system. Based on the distinguish pathways stored in the modules of the server computing device of the brain tumor types distinguish system and the training method of the modified VGG16 model, the brain tumor types distinguish system of this disclosure can achieve a better distinguish sensitivity, and determine the proper image type for distinguishing the types of brain tumors by analysis.

Therefore, when the tumor image of a new patient is subsequently subjected to distinguish, the brain tumor types distinguish system can perform the distinguishing process based on the brain image in cooperation with the corresponding mask, or the corresponding partial image, or the corresponding mask and partial image.

In summary, the brain tumor types distinguish system of this disclosure can distinguish the type of brain tumor of patient based on the brain tumor images, and provide the distinguish result of the brain tumor type to medical staffs, so that the medical staffs can provide proper treatment methods for different patients, thereby improving the treatment effect.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A brain tumor types distinguish system, comprising:
an image outputting device outputting at least three brain images captured from a position of a brain tumor, wherein the brain images are magnetic resonance imaging images; and
a server computing device, wherein the server computing device pre-stores a plurality of distinguish pathways corresponding to different types of brain tumors, and the server computing device comprises:
an image receiving module receiving the brain images;
an image pre-processing module pre-processing the brain images to obtain corresponding processed images thereof;
a data comparison module comparing the brain images and the processed images with the distinguish pathways to obtain at least three comparison results; and
a distinguish module statistically analyzing the comparison results to obtain a distinguish result,
wherein the image pre-processing module comprises:
a mask processing unit performing an auto-detection with each of the brain images and selecting a position of the brain tumor so as to obtain a mask; and
a partial image capturing unit capturing a part of each of the brain images around the selected position to obtain a partial image, wherein the processed image is the mask or the partial image.

2. The brain tumor types distinguish system of claim 1, wherein the distinguish module comprises:
a scoring unit evaluating each of the comparison results to obtain a scoring result; and
a distinguish unit statistically analyzing the scoring results to obtain the distinguish result.

3. The brain tumor types distinguish system of claim 2, wherein the comparison result comprises Vestibular Schwannoma, Meningioma, Pituitary Adenoma, Schwannoma, Glioma, or Metastasis.

4. The brain tumor types distinguish system of claim 3, wherein the scoring unit further performs a weighting process to the comparison result of Meningioma so as to obtain a weighted scoring result.

5. The brain tumor types distinguish system of claim 1, wherein the server computing device further pre-stores favorite location information of the different types of brain tumors, the data comparison module further compares the brain images and the processed images with the favorite location information to obtain at least three favorite-location comparison results, and the distinguish module statistically analyzes the comparison results and the favorite-location comparison results to obtain the distinguish result.

6. The brain tumor types distinguish system of claim 1, wherein the server computing device further comprises a distinguish result outputting module for outputting the distinguish result.

7. The brain tumor types distinguish system of claim 6, wherein the server computing device further comprises a processor, and the processor executes the image receiving module, the image pre-processing module, the data comparison module, the distinguish module and the distinguish result outputting module; and wherein the brain tumor types distinguish system further comprises a user computing device for receiving the distinguish result outputted from the server computing device.

8. The brain tumor types distinguish system of claim 1, wherein the server computing device analyzes a plurality of different types of brain tumor reference images to obtain the distinguish pathways.

9. A server computing device, which is applied to a brain tumor types distinguish system, the brain tumor types distinguish system comprising an image outputting device and the server computing device, the image outputting device outputting at least three brain images captured from a position of a brain tumor, the server computing device pre-storing a plurality of distinguish pathways corresponding to different types of brain tumors, the server computing device comprising:
  an image receiving module receiving the brain images;
  an image pre-processing module pre-processing the brain images to obtain corresponding processed images thereof;
  a data comparison module comparing the brain images and the processed images with the distinguish pathways to obtain at least three comparison results; and
  a distinguish module statistically analyzing the comparison results to obtain a distinguish result,
  wherein the brain images are magnetic resonance imaging images,
  wherein the image pre-processing module comprises:
  a mask processing unit performing an auto-detection with each of the brain images and selecting a position of the brain tumor so as to obtain a mask; and
  a partial image capturing unit capturing a part of each of the brain images around the selected position to obtain a partial image, wherein the processed image is the mask or the partial image.

10. The server computing device of claim 9, wherein the distinguish module comprises:
  a scoring unit evaluating each of the comparison results to obtain a scoring result; and
  a distinguish unit statistically analyzing the scoring results to obtain the distinguish result.

11. The server computing device of claim 10, wherein the comparison result comprises Vestibular Schwannoma, Meningioma, Pituitary Adenoma, Schwannoma, Glioma, or Metastasis.

12. The server computing device of claim 11, wherein the scoring unit further performs a weighting process to the comparison result of Meningioma so as to obtain a weighted scoring result.

13. The server computing device of claim 9, wherein the server computing device further pre-stores favorite location information of the different types of brain tumors, the data comparison module further compares the brain images and the processed images with the favorite location information to obtain at least three favorite-location comparison results, and the distinguish module statistically analyzes the comparison results and the favorite-location comparison results to obtain the distinguish result.

14. The server computing device of claim 9, further comprising:
  a distinguish result outputting module for outputting the distinguish result; and
  a processor executing the image receiving module, the image pre-processing module, the data comparison module, the distinguish module and the distinguish result outputting module.

15. The server computing device of claim 9, wherein the server computing device analyzes a plurality of different types of brain tumor reference images to obtain the distinguish pathways.

16. A non-transitory computer readable storage medium applied to a brain tumor types distinguish system and storing a program code, wherein the program code is executed by a processor of a computing device to implement the modules as recited in claim 1.

* * * * *